United States Patent
Baur

(10) Patent No.: US 6,579,550 B1
(45) Date of Patent: Jun. 17, 2003

(54) METHOD FOR PRODUCING SLICES OF BULK FOODSTUFF MATERIALS

(75) Inventor: Wilhelm Baur, Gestratz (DE)

(73) Assignee: Natec Reich, Summer GmbH & Co. KG, Heimenkirch (DE)

( * ) Notice: Subject to any disclaimer, the term of this patent is extended or adjusted under 35 U.S.C. 154(b) by 0 days.

(21) Appl. No.: 09/806,012

(22) PCT Filed: Aug. 26, 1999

(86) PCT No.: PCT/EP99/06252

§ 371 (c)(1),
(2), (4) Date: May 3, 2001

(87) PCT Pub. No.: WO00/18248

PCT Pub. Date: Apr. 6, 2000

(30) Foreign Application Priority Data

| Sep. 30, 1998 | (DE) | 198 44 900 |
| Jul. 20, 1999 | (DE) | 199 33 940 |

(51) Int. Cl.⁷ .............................................. A23C 19/00
(52) U.S. Cl. ................ 426/279; 426/249; 426/282; 426/582
(58) Field of Search ................ 426/279, 249, 426/282, 582, 414

(56) References Cited

U.S. PATENT DOCUMENTS

| 2,668,114 A | * | 2/1954 | Hensgen | 426/279 |
| 3,909,881 A | * | 10/1975 | Anderson | 426/282 |
| 4,293,296 A | | 10/1981 | Caiello et al. | |
| 4,735,817 A | * | 4/1988 | Smith | 426/582 |
| 4,994,288 A | | 2/1991 | Graham et al. | |
| 5,208,059 A | * | 5/1993 | Dubowik et al. | 426/282 |
| 5,885,642 A | * | 3/1999 | Hederer et al. | 426/582 |

FOREIGN PATENT DOCUMENTS

| DE | 2 219 629 | 11/1972 |
| DE | 2 161 211 | 12/1972 |
| EP | 0 206 898 | 12/1986 |

* cited by examiner

Primary Examiner—Lien Tran
(74) Attorney, Agent, or Firm—Herbert Dubno

(57) ABSTRACT

A method for producing slices from formable food masses, of which at least one mass is a cheese preparation. A mass is brought into slice form in particular by means of rolls, belts or plates. After or during the flattening by pressing or a flat application of the mass to a layer of a certain thickness, the mass is not applied to specified or unspecified points of the layer or displaced to such an extent that, at these points, depressions, holes and/or free areas occur. Following this, the depressions/holes/free areas are filled out by at least a second mass which differs from the first mass in type/kind, in particular in color.

7 Claims, 2 Drawing Sheets

METHOD FOR PRODUCING SLICES OF BULK FOODSTUFF MATERIALS

CROSS REFERENCE TO RELATED APPLICATIONS

This application is a national stage of PCT/EP99/06252 filed Aug. 26, 1999 and is based upon German national applications 198 44 800.3 of Sep. 30, 1998 and 199 33 940.6 of Jul. 20, 1999 under the International Convention.

FIELD OF THE INVENTION

The invention relates to a method for producing slices from formable food masses, of which at least one mass is a cheese preparation, whereby a mass is brought into the slice form in particular by means of rolls, belts or plates.

BACKGROUND OF THE INVENTION

It is known to produce a sausage from two different masses and subsequently to cut the sausage into single slices in which the different masses are delimited from each other and in particular visible as a pattern. It is further known to press slices of processed cheese into a flat layer within the film and only afterwards to press, seal and cut the strip, consisting of the cheese layer and film wrapping, into single slices.

OBJECT OF THE INVENTION

The object of the invention is to provide a method of the type described at the outset by which, in a simple way, with a minimal reject rate and at high speed, slices can be produced from a food mass consisting of at least two different masses in delimited form, whereby the layers have a high degree of uniformity.

SUMMARY OF THE INVENTION

This object is achieved according to the invention in the manner that, after or during a flattening by pressing or flat application of the mass to form a layer of a certain thickness, the mass is not flattened at specified or unspecified points or is displaced to such an extent that depressions, holes and/or free areas occur at these points and that subsequently the depressions/holes/free areas are filled out by at least a second mass which differs from the first mass in type/kind, or color.

By means of such a method slices can be produced in a simple way from two different food masses, whereby these two masses are delimited from each other in order to create a pattern. With this method a broad variety of shapes can be produced, whereby, with a minimal reject rate, a high production speed and precision can be achieved.

According to the invention the method for producing slices from at least two formable food masses, of which one mass is a cheese preparation, involves flattening a first of the masses into a slice form by means of rolls, belts or plates. After or during the flattening by pressing or a flat application of the first mass to a layer of a certain thickness, localized deformations in the form of depressions, holes and/or recesses are worked into or remain in this mass at specified or unspecified points. A second mass is then rolled or poured into the deformations, the second mass differing from the first, in particular in color. The depressions/holes/free areas are worked into the first mass by means of a profiled tool, in particular, a profiled roll. The first mass can be applied when the projections of the profiled tool, particularly a profiled roll, are close to the support, in particular a cooling roll. The first mass can be rolled into a first layer on a cooling roll by means of a first roll. The free areas can be worked into the first mass, in particular, on the circumference of the cooling roll. Then, the second mass can be foiled onto the first mass layer on the circumference of the cooling roll by a third roll. In order to produce single slices, after production of the strip from at least two masses, the strip can be enveloped by a travelling film, which is sealed lengthwise, after which the mass is displaced crosswise in the region of the subsequent cutting points and the film is cut crosswise. In order to produce single slices, after production of the strip from at least two masses, the strip can be cut into individual slices and the slices can be packed individually, or the slices can be stacked and the stacks packed.

BRIEF DESCRIPTION OF THE DRAWING

Two embodiments of the method according to the invention are illustrated in the drawing and will be described in greater detail hereinafter.

In the drawing.

SPECIFIC DESCRIPTION

Figure 1:
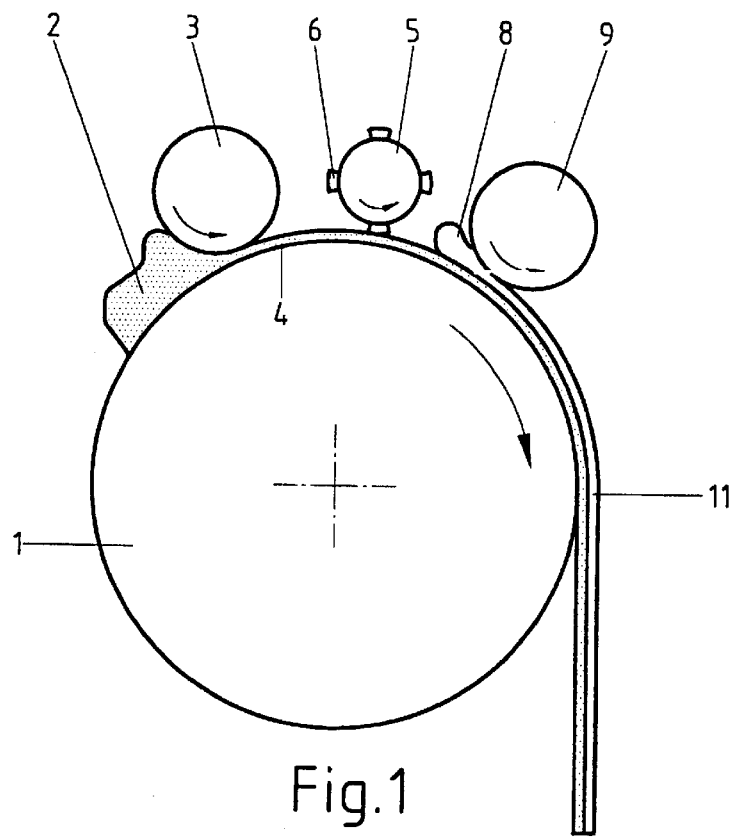
FIG. 1 is a side view of a cooling roll with rolls arranged around it.
Figure 3:
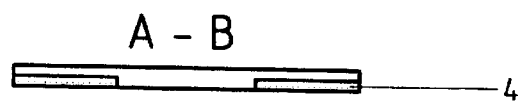
FIG. 3 is a section along line A–V in FIG. 2.
Figure 2:
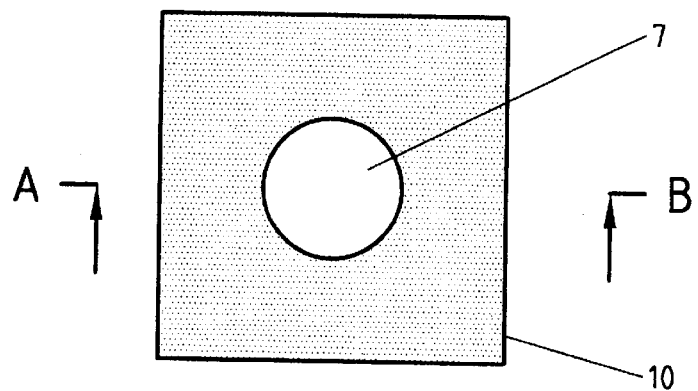
FIG. 2 is a top view of a slice produced from two different food masses.

On the surface of a roll, in particular a cooled roll (cooling roll 1), a dough-like food mass 2 is applied and rolled flat by a roll 3 with an axis parallel to that of cooling roll 1. The layer 4 rolled flat between rolls 1 and 3 arrives at a profiled roll 5 having projections 6 at regular intervals around its circumference by means of which depressions and/or holes are pressed into the layer 4 so that at these points the mass is either completely or partially displaced. The depressions/holes can have a regular or irregular shape.

Behind the profiled roll 5 a second layer 8 of food mass is applied to the layer 4, which second layer 8 is rolled onto the layer by a second roll 9, the axis of which is parallel to that of the cooling roll, so that the layer 8 fills out the depressions/holes 7 in the first layer 4. In this case, the layer 8 can either only fill out the depressions/holes 7 or, additionally, form a second layer on the first layer 4.

The masses or layers, respectively, applied to the cooling roll 1 were heated beforehand so that they are sufficiently flowable. During application to the circumference of the cooling roll 1 they are then cooled such that they assume a more solid consistency.

The projections 6 of the partial roll 6 can possess a broad variety of shapes. There may, in this case, be several projections per slice. The projections 6 have a circular shape so that the depressions or holes in the cheese slice 10 are circular and in particular are located centrally.

After production of the strip 11 from at least two food masses, in particular processed cheese types with different coloring, the strip 11 is enveloped by a travelling film (not shown). This film is sealed lengthwise. Following this, the mass of the strip 11 is displaced crosswise in the region of the subsequent cutting points and the film is cut at these points, thus producing slices 10 packed individually in film. Since the film is transparent, the two different food masses are recognizable.

In an alternative, after production of the strip 11, the latter is cut into single slices and the slices are packed individually in film.

Instead, several slices 10 can be stacked one above the other and only then is the stack packed in film. When this is done, sections of film or paper can be laid between the individual slices in order to prevent the slices from sticking together.

The method can also be applied using fewer rolls, in particular without cooling rolls. Furthermore, the profiled roll can be replaced by another tool which displaces the mass. The rolls 3 and 5 can also be developed as a single roll.

In further embodiments (not shown) the masses are pressed flat by belts or plates instead of rolls. The method can be applied to especial advantage with a formable (dough-like) cheese, sausage, chocolate, or confectionery preparation.

Figure 4:
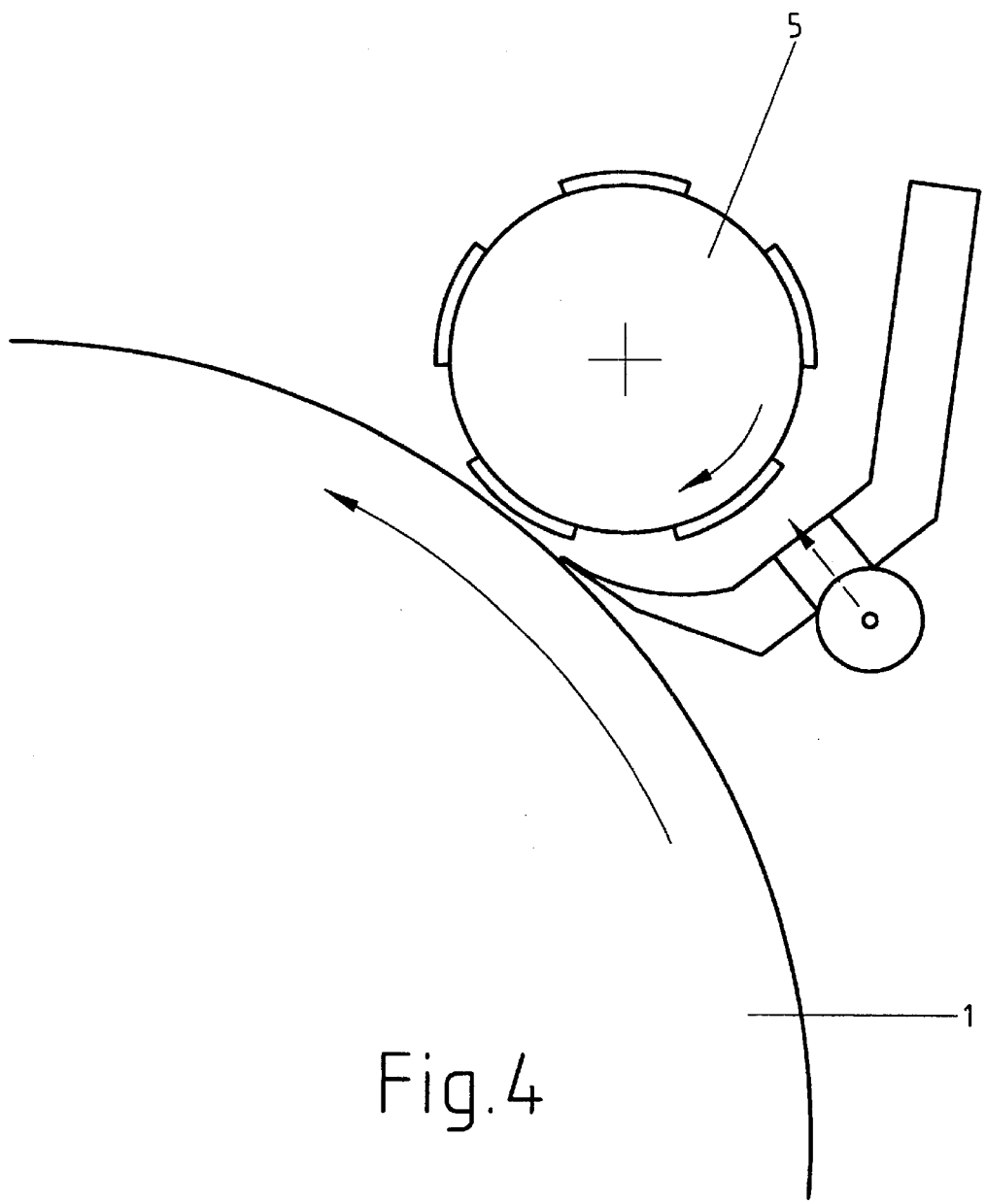
FIG. 4 is a side view of a second embodiment of a cooling roll with a profiled roll arranged on it.

FIG. 4 shows an embodiment in which the food mass is applied at the point at which the projections 6 of the profiled roll 5 are closest to the cooling roll 1 so that the first mass 2 cannot flow out in the region of a projection 6 but only around the projection 6. The holes or free areas (blank areas) thus remain free of mass from the beginning so that the mass does not have to be displaced. In this way, no irregularities in the mass layer occur in the regions between the projections or between the free areas, such as can occur in the case of displacement.

One of the two masses is always a cheese preparation and the other mass is a cheese preparation with a coloration that differs from the other cheese preparation or a chocolate mass or a chocolate preparation.

What is claimed is:

1. A method of producing individual slices of processed cheese as cut from strip comprising the steps of:
    (a) forming a layer of a first processed cheese with open areas by rolling the first processed cheese flat with a roll against its surface;
    (b) applying to said layer of said first processed cheese upstream of a roller a flowable second processed cheese of a coloration different from that of said first processed cheese so that said second processed cheese is rolled onto the layer and fills said open areas whereby regions of said first and second processed cheeses are discernible at said open areas and around said open areas;
    (c) obtaining from said layer a processed cheese strip with said second processed cheese filling said open areas and with different colorations of the respective processed cheese; and
    (d) cutting individual slices of processed cheese from said strip.

2. The method defined in claim 1 wherein said open areas are depressions or holes formed in said layer by pressing a profiled tool into said layer prior to the application of said second processed cheese to said layer.

3. The method defined in claim 2 wherein said profiled tool is pressed into said layer by rolling said tool into contact with said layer.

4. The method defined in claim 1 wherein said open areas are formed by applying said first processed cheese to a cooling roll to form said layer around projections of a profiled tool extending close to said cooling roll.

5. The method defined in claim 1 wherein said second processed cheese is applied as a layer onto the layer of said first processed cheese.

6. The method defined in claim 5 wherein said layer of said first processed cheese is rolled onto a cooling roll, said open areas are depressions or holes formed in said layer of said first processed cheese by pressing projections of a second roll forming a profiled tool into said layer of said first processed cheese, and said second processed cheese is applied as a layer to said layer of said first processed cheese by a third roll.

7. The method defined in claim 1, further comprising the step of wrapping said strip with said second processed cheese filling said open areas in a film before cutting the wrapped layer to form said slices.

\* \* \* \* \*